Feb. 17, 1959 W. A. ESCHENBURG ET AL 2,873,630

POWER FEED MECHANISMS

Filed May 19, 1953 6 Sheets-Sheet 1

INVENTORS
WILLIAM A. ESCHENBURG
CLARENCE JOHNSON
DAVID D. PETTIGREW
BY Strauch, Nolan & Diggins
ATTORNEYS

POWER FEED MECHANISMS

Filed May 19, 1953 6 Sheets-Sheet 2

INVENTORS
WILLIAM A. ESCHENBURG
CLARENCE JOHNSON
DAVID D. PETTIGREW
BY Strauch, Nolan & Diggins
ATTORNEYS Feb. 17, 1959 W. A. ESCHENBURG ET AL 2,873,630

POWER FEED MECHANISMS

Filed May 19, 1953 6 Sheets-Sheet 3

INVENTORS
WILLIAM A. ESCHENBURG
CLARENCE JOHNSON
DAVID D. PETTIGREW
BY Strauch, Nolan & Diggins
ATTORNEYS INVENTORS
WILLIAM A. ESCHENBURG
CLARENCE JOHNSON
DAVID D. PETTIGREW
BY Strauch, Nolan + Diggins
ATTORNEYS INVENTORS
WILLIAM A. ESCHENBURG
CLARENCE JOHNSON
DAVID D. PETTIGREW
BY Strauch, Nolan + Diggins
ATTORNEYS Feb. 17, 1959 W. A. ESCHENBURG ET AL 2,873,630

POWER FEED MECHANISMS

Filed May 19, 1953 6 Sheets-Sheet 6

INVENTORS
William A. Eschenburg
Clarence Johnson
David D. Pettigrew
BY Strauch, Nolan & Diggins
ATTORNEYS United States Patent Office 2,873,630

Patented Feb. 17, 1959

2,873,630

POWER FEED MECHANISMS

William A. Eschenburg, Plainfield, N. J., David D. Pettigrew, Milwaukee, Wis., and Clarence Johnson, South Euclid, Ohio, assignors, by mesne assignments, to The Hartford Special Machinery Company, Hartford, Conn., a corporation of Connecticut Application May 19, 1953, Serial No. 355,922

23 Claims. (Cl. 77—33.5)

The present invention relates to hydro-pneumatic power mechanism for positioning power driven tools with respect to work pieces and, more specifically to automatic feed and retract mechanisms particularly adapted for use with drill presses and the like.

In the usual production applications of automatically controlled drill presses and like machines, it is desirable, to minimize the time for performing a single operation by advancing the tool to the point at which it engages the work at a relatively rapid rate, and then decreasing the rate of advance or "feed" to a rate compatible with the type of material being cut, the size of the bore, etc. Then, when the hole is completely drilled, it is desirable to retract the tool to its starting position ready for another cycle as rapidly as possible.

The same procedure is desired when machining operations are performed on materials of differing hardness, e. g., laminated pieces, in which case a higher rate of feed is desirable through the softer material and a reduced rate at the start of the layer of harder material.

However, while the foregoing cycle is probably the most common employed in drilling operations, it is frequently necessary that the retract stroke, or at least a portion of it, also be accomplished at a slow, control rate. Thus, when a drill press is used for tapping a hole, it is necessary to advance the tool rapidly and then tap at a reduced feed rate and retract at the same reduced rate of speed. Also, for back spot-facing operations it is sometimes desirable that the unit traverse rapidly for a portion of its retraction stroke and then feed back at a slower rate for the remainder of the retraction stroke during which time the back spot facing operation is accomplished.

The present invention represents an improvement over the mechanisms disclosed in copending applications Serial Nos. 133,922, 161,711 and 214,284, filed on December 19, 1949, May 12, 1950 and March 7, 1951, respectively, which issued as Patent Nos. 2,715,389, 2,733,691 and 2,655,058, respectively, by providing a power mechanism and control system for machine tools which is susceptible of simplified, more economical manufacture and affords greater simplicity, versatility and flexibility in operation.

Accordingly, the present invention contemplates hydro-pneumatic power mechanisms and control systems which will effect a cycle with two different and infinitely adjustable rates of advance feed with retraction at a single adjustable rate, or a cycle with two different rates of advance feed and two different rates of retraction and means for substantially instantaneously selecting one or the other type of cycle. The invention further contemplates means for quickly, easily and accurately adjusting the length of stroke of the tool and an overall structural configuration and arrangement of parts which reduces close tolerances and precision machining operations to a minimum, is easily assembled and disassembled, and utilizes fewer parts.

It is a basic object of the present invention to provide a novel, hydro-pneumatical power and control mechanism which is capable of selectively effecting two distinct cycles of operation.

It is a further object of the invention to provide an improved hydro-pneumatical power and control mechanism tool having a cycle comprising two different and infinitely adjustable advance feed rates and a single adjustable retraction or back feed rate and another distinct cycle comprising two different and infinitely adjustable advance feed rates and two different rates of retraction or back feed.

Another object of the invention is the provision of an improved hydro-pneumatical power system for advancing and retracting a machine tool at differing rates including means for adjusting the length of stroke at each rate.

It is a further object of the invention to provide a novel hydro-pneumatic control system including valve means for substantially instantaneously changing the cycle of operation of the system.

It is a still further object of the invention to provide a hydro-pneumatical power mechanism having means for quickly, easily and accurately adjusting the total length of stroke of the power element.

Another object of the invention is the provision of means for regulating the total length of stroke of a power feed mechanism which means is quickly adjustable by means of a compact mechanism utilizing fewer moving parts having increased accuracy, strength and reliability.

Still another object of the invention is to provide abutment means for limiting the stroke of power tools including a stop nut having combined means for producing rotational and translational movement thereof.

A further object of the invention is the provision of a machine tool and power and control system therefor comprising frame and housing members adapted to simple and economical manufacturing operations requiring few close tolerances and containing easily removable and replaceable functional members.

It is another object of the invention to provide an improved hydro-pneumatically operated power tool which combines compactness of construction, ease of maintenance, simplicity of operation, and which is rugged, longwearing, affords long, trouble-free service and is relatively inexpensive to manufacture.

These and further objects and advantages will become apparent to those conversant with the art from a reading of the following description in conjunction with the subjoined claims and the annexed drawings in which:

Figure 6 is a sectional view taken on line 6—6 of Figure 2;

Figures 1, 8, 11:
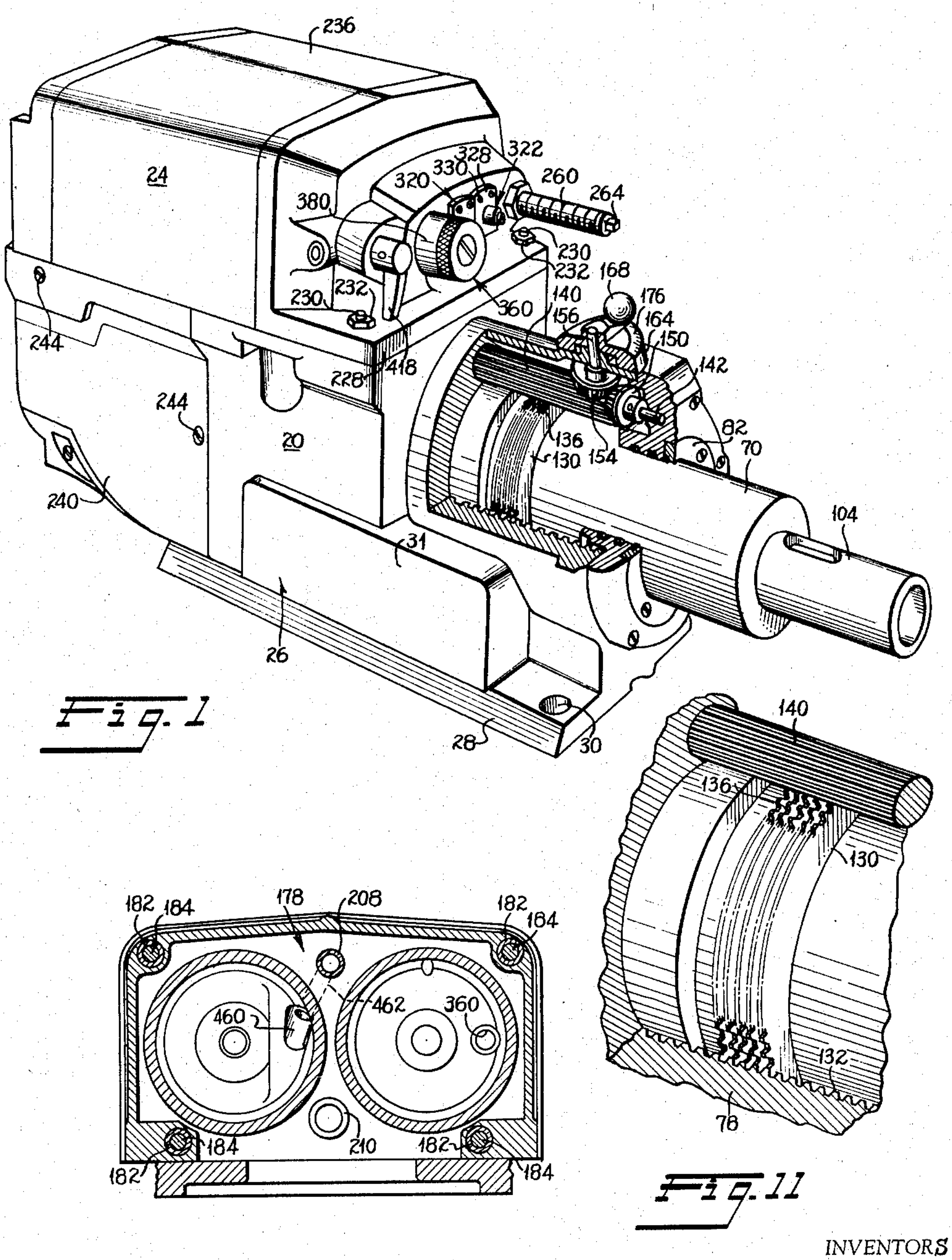
Figure 1 is a perspective elevational view of the power tool of the present invention with portions broken away to show details of construction.
Figure 8 is a diagrammatic view of the hydro-pneumatic operating system.
Figure 11 is an enlarged fragment of Figure 1 showing the details of construction of the quill stop abutment in perspective elevation.
Figure 2:
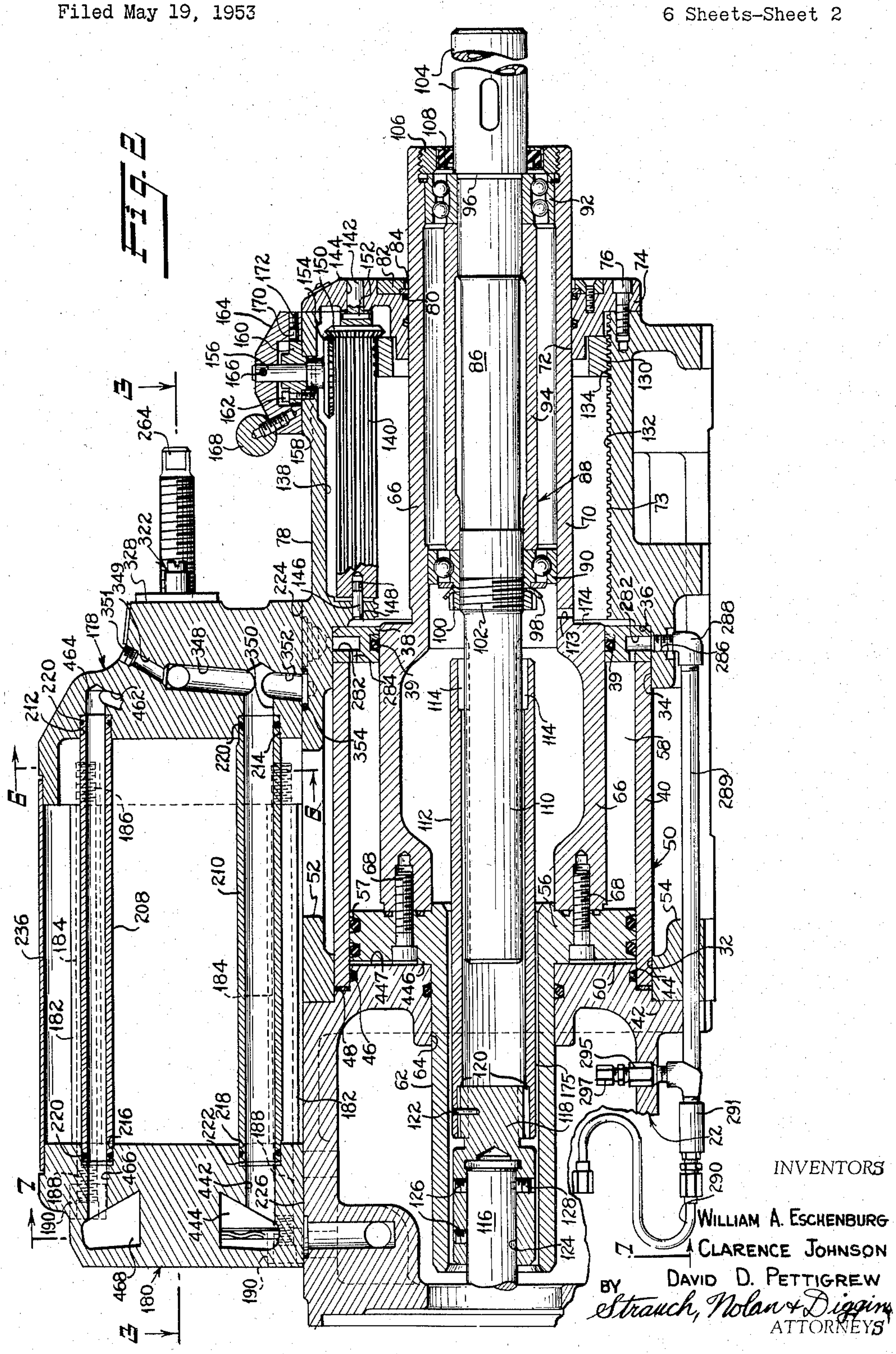
Figure 2 is a vertical sectional view through the center line of the drill spindle.

Referring to the drawings and first, in particular, to Figures 1 and 2, the hydro-pneumatic unit of the present invention consists of a power section 20, including a tail piece 22, and a control section 24, which sections are rigidly integrated into a single compact assembly in a manner which will become fully apparent as the description proceeds.

The main structural element of the power section is a body or housing member, indicated generally by reference character 26, formed, preferably by casting, with a base or mounting flange 28 having a plurality of suitably located holes 30 (one shown, Figure 1) accommodating the passage of studs or bolts (not shown) enabling the unit to be conveniently mounted on a drill press standard or the like. The housing 26 is also formed with parallel, accurately machined surface 31 (one shown, Figure 1) for facilitating the mounting and alignment of the unit on a suitable support.

The interior walls of housing 26 define a pair of spaced cylindrical concentric lands 32 and 34, and an annular shoulder 36 located adjacent the forward land 34. A quill seal retainer ring 38, holding a quill sealing ring 39 and seated on land 34, is maintained in abutment with shoulder 36 by a machined cylindrical liner 40, disposed within the housing with ends received in lands 32 and 34. Tail piece 22 carries a reduced diameter aligning portion 42, which locates a further reduced portion 44 concentrically with respect to lands 32 and 34 and interiorly the rearward end of liner 40, and O-ring 46 being provided to seal the mating surfaces of the sleeve and reduced portion 44. An annular wave spring 48, located between the rearward end of liner 40 and the face of the aligning portion 42 biases the liner against the quill seal retainer ring. Thus, when assembled as shown in Figure 2, the liner 40 is securely retained and accurately located in position, providing, with a minimum of close tolerances and difficult machining operations, a quickly replaceable power cylinder 50 having a rear cylinder head defined by reduced portion 44 of the tail piece and forward cylinder head defined by the retainer ring 38. Furthermore, this construction eliminates the necessity of a solid main casting having an integral cylinder and consequently, the casting may be formed with openings such as 52 and 54 at the top and bottom, respectively in order to reduce the weight of the finished product.

A power piston 56 provided with suitable peripheral packing rings 57 is slidably received within cylinder 50, dividing it into a forward chamber 58 and a rear chamber 60. The rear face of the piston carries a tubular guide extension 62 slidably received in a guide bore 64 in the end of wall of tail piece 22 and the forward face is secured to a hollow quill 66 as by a plurality of counter sunk cap screws 68. The forward end of the quill has a reduced tubular extension 70 slidably journalled in a bore 72 in a quill support cap or closure plate 74 fastened as by screws 76 to the nose section 78 formed integrally with the housing member.

The integral construction of the main housing member 26 and nose section 78 eliminates the difficult and costly operations involved in machining a separate nose piece and holding bore 72 and the inner bore 73 of nose section concentric with land 32 within very close tolerances. With the integral casting construction, it is possible to machine lands 32 and 34 and bore 73 using one fixture and one setup thereby automatically maintaining cencentricity. Furthermore, it will be noted that, with this construction, there is only one point of connection where close tolerances are necessary to maintain concentricity between lands 32 and 34 and bore 73, that is, between the mating surfaces 75 of the quill support and the bore 73 of the nose section.

The cap 74 is recessed around bore 72 to accommodate a felt wiper ring 80 and a retainer 82 carrying a scraper ring 84, the wiper and scraper serving to distribute lubricant and exclude foreign particles from the interior of the nose section.

A rotatable spindle 86 is journalled in the hollow quill 66 by a pre-loaded bearing assembly indicated generally at 88 and including ball bearings 90 and 92, separated by a spacer sleeve 94 and locked in position against shoulder 96 on the spindle by means of a bearing washer 98 and a bearing nut 100 threadedly secured to a threaded section 102 of the spindle. The forward or tool receiving end 104 of the spindle projects from the quill through a quill closure nut 106 carrying a suitable resilient packing element 108 in wiping engagement with the spindle thus effectively preventing the entry of deleterious foreign particles into the quill.

The opposite or rearward end portion 110 of the spindle is telescoped by a drive sleeve 112 and axially slidably coupled thereto by key and slot assemblies 114.

Any desired type of power source, for example, an electric motor, fluid motor, or the like, not shown, having a power take-off shaft is drivingly coupled to the drive sleeve by an adapter 118 one end of which extends into and is splined and keyed to the drive sleeve as indicated at 120 and 122, respectively, and the other end of which is in the form of a socket 124 adapted to receive power shaft 116 and provided with set screws 126 to prevent rotation of the shaft in the socket and an additional set screw 128 to align the power shaft axis with the axis of the spindle.

From the structure so far described it will be appreciated that the power piston 56 and the quill 66 as a unit, are freely, axially slidable in the housing to effect advancement and retraction of the spindle 86, while the spindle is maintained in rotary driving relation to the power source. In order to adjustably limit the stroke of the quill, and, therefore, the spindle, an adjustable annular stop nut 130 is provided within the nose section 78.

As can be seen in Figures 1, 2 and 11, the internal bore 73 of the nose section is formed with helical threads 132 along its entire length. The exterior periphery of stop nut 130 is formed with a complementary helical thread 134 adapted to coact with threads 132, to move the nut longitudinally along the axis of the nose section when the nut is rotated. In addition, the stop nut threads 134 are transversely notched to form a plurality of spur gear teeth 136 as best shown in Figure 11.

The upper portion of the inner cylindrical wall of nose section 78 is formed with an elongated recess 138 adapted to accommodate a spline gear 140 having teeth in mesh with the gear teeth 136 on the stop nut.

Spline gear 140 is rotatably journalled in the recess 138, at its forward end by means of a reduced portion 142 received in a suitable bore 144 in nose cap 74, and at its opposite end by means of a stud 146 rotatably engaged in a bore 148 in a rear wall of the nose section.

A bevel gear 150, fixedly secured to the reduced end portion 142 of spline gear 140, as by a pin 152, meshes with a second bevel gear 154, mounted on a shaft 156 and drivingly secured thereto by a pin 158. Shaft 156 is journalled in a bushing plate 160 secured to the top of the nose section as by bolts 162 and carries a micrometer dial 164 pinned as at 166 to its outer end. A knob 168, freely rotatably secured to the dial is provided for turning the dial. The peripheral portion of dial 164 adjacent bushing 160 contains a through bore receiving a plug 170 (preferably of brass or similar soft metal) which may be selectively forced against the bushing by a set screw 172 to lock the dial in any desired position of angular rotation.

From the structure just described it will be apparent that rotation of the dial 164 rotates meshed bevel gears 150 and 154 to impart rotation to the spline gear 140 about its longitudinal axis. The gear teeth on the spline gear cooperate with the gear teeth on depth stop nut 130 and cause the nut to rotate about its axis. Since the nut also carries screw threads 134 in engagement with threads 132 on the interior of the nose section, this rotary motion is translated into linear displacement of the nut longitudinally of the nose section. Thus the nut may be adjusted to occupy any of the infinite intermediate positions between the ends of the nose section, the forward travel of the quill being arrested at the point at which a shoulder 174 thereon abuts the stop nut. For a given number of revolutions of the dial 164, the stop nut will be caused to move a given distance along the axis of the nose section; the dial is therefore inscribed with peripheral graduations 176 which cooperate with a scribe mark (not shown) on the nose piece so as to enable an operator accurately to reposition the stop nut at a predetermined distance from any starting position. The graduations do not, nor are they intended to indicate the absolute position of the stop nut. They merely enable the operator to move the nut from one position to another, removed from the first position by a given distance and once adjusted, accidental readjustment may be prevented by tightening set screw 172.

Forward movement of the stop nut (to the right as viewed in Figure 2) is limited by its engagement with quill support 74. In this extreme forward position of adjustment of the nut, advancement of the quill assembly is halted before the power piston 56 strikes the quill seal retainer ring 38.

By forming both threads and gear teeth on the outer periphery of the stop nut, the transmission of rotary motion and its translation into linear motion is accomplished by the use of a single element. This is particularly advantageous in the subject and similar devices where space is limited and the number of moving parts must be held to a minimum. Furthermore, with the particular gearing arrangement shown, any reasonable mechanical advantage can be obtained from different combinations of bevel gears 150, 154 and spline gear 140, without substantially lengthening the time required to make adjustment. For example, when large units are involved, the size of the parts increase and the effort to move them becomes correspondingly greater. With the present construction a large mechanical advantage may be provided and still it is quickly possible to effect an adjustment by simply grasping knob 140 with one hand and rapidly turning the dial 164, due to the high mechanical advantage of the gear train and the short turning radius of the dial and knob.

The threads on the stop nut are formed with slightly higher crests than the corresponding roots of the threads in the nose section to insure that bearing between the nut and the nose section takes place between the crest of the threads on the former and the root of the thread on the latter, while clearance is maintained at the flank of the threads. The gear tooth engagement between the spline gear 140 and the stop nut and the shape of the gear teeth thereon (pressure angle) create a tendency to force the two members apart when the spline gear is rotated; if the height of the thread crest on the stop nut were equal to or less than the root depth of the thread on the nose section, there would be a tendency for the threads to wedge which would, of course, increase the friction and consequently, the effort necessary to effect an adjustment of the stop nut, which tendency is eliminated by the foregoing construction of the threads. It will be understood that this result may also be effected by the utilization of threads on the nose section which are higher than roots of the thread on the stop nut.

As will be seen in Figure 2, a venting port 173 is provided through the wall of tubular extension 66 of the quill which permits the escape and prevents compression of air trapped in the nose section as the quill is advanced and, conversely, prevents the creation of a vacuum in the nose section as the quill is retracted. The interior of the nose section is in communication with the atmosphere through vent 173 and clearance space 175 between drive sleeve 112 and the tubular extension 62 on piston 56.

The volume of the space behind end portion 110 of spindle 86 varies inversely as the volume of the interior of the nose section during movement of the quill and since these chambers are in communication through the clearance between the splined joint between members 110 and 112, and vent 173, as well as being in communication with the atmosphere through clearance space 175, the inversely varying volumes compensate each other to a degree and no suction or pressure is created at any point in the system.

The hydro-pneumatic system for operating and controlling the movements of the spindle will now be described.

Referring to Figure 2, the control section 24 consists generally of a front cap 178 and a rear cap 180 maintained in spaced relation by form tubular spacers 182 containing tie rods 184 threaded, at one end, to the front cap as at 186 and passing through suitable holes 188 in the rear cap to be engaged by threaded fasteners such as socket nuts 190 recessed or countersunk in the back face of the rear cap.

Figures 3, 4, 5, 12:
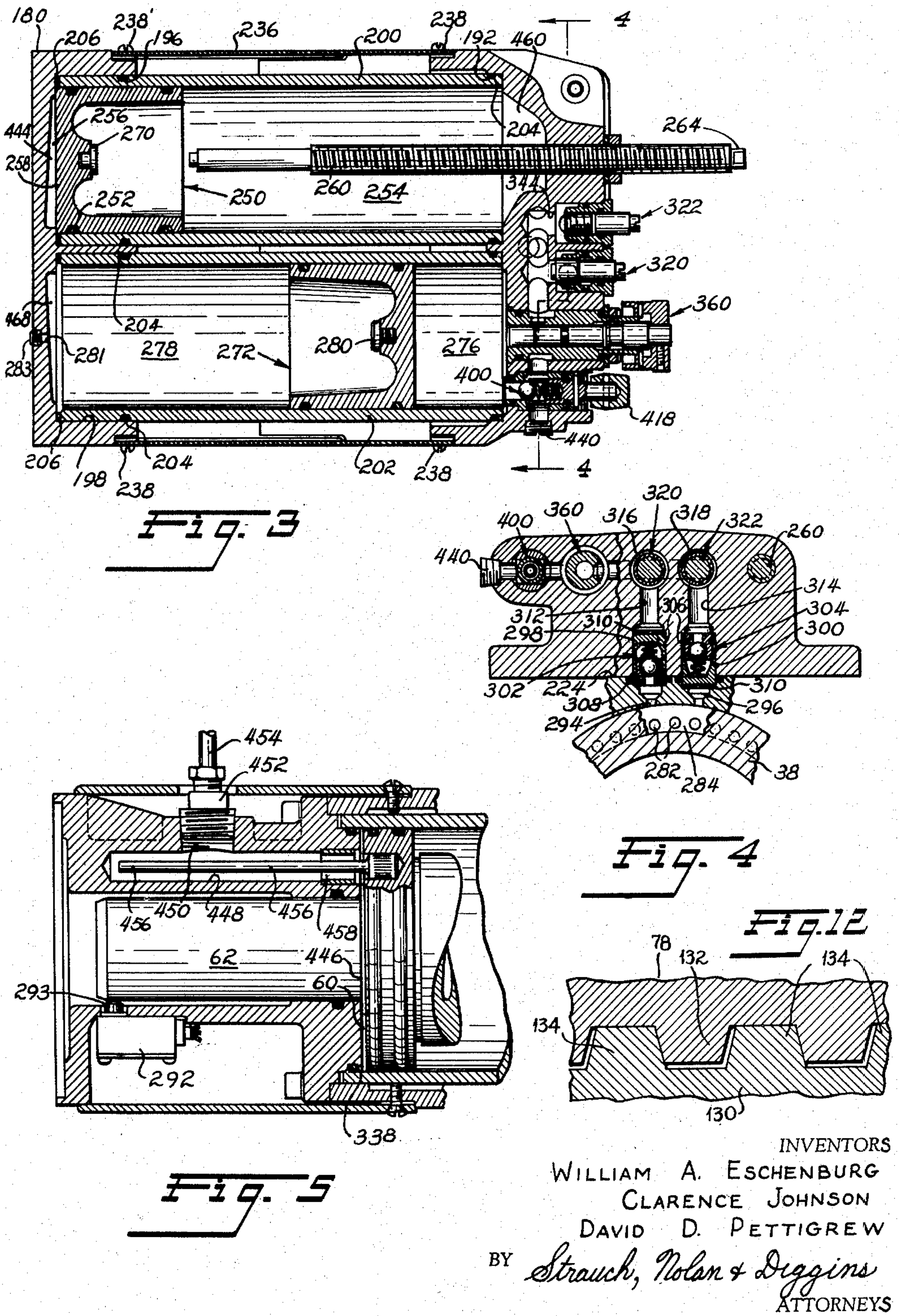
Figure 3 is a horizontal sectional view taken on line 3—3 of Figure 2 showing the structure of the control section.
Figure 4 is a fragmental sectional view taken on line 4—4 of Figure 3 and partially broken away to clarify the details of underlying structure.
Figure 5 is a horizontal section of the rear portion of the power section taken on the center-line of the power piston as indicated by line 5—5, Figure 7.
Figure 12 is an enlarged fragmentary view of the thread construction utilized in the final stop unit.

The inner or rear face of the front cap is provided with a pair of annular recesses 192 and 194, as best shown in Figure 3, while the forward face of the rear cap is similarly provided with a pair of annular recesses 196 and 198, respectively in coaxial alignment with recesses in the front cap. Each aligned pair of recesses freely receives the ends of cylindrical sleeves 200 and 202 which define cylinders hereinafter referred to as the "rapid approach cylinder" and the "feed rate control" cylinder, respectively. Suitable packing elements such as O-rings 204 are provided at each end of both cylinders to effect a seal between the respective sleeves and recesses and in addition, annular wave springs 206 provided in each of the rear cap recesses and engaging the respective ends of the cylinder sleeves urge the sleeves forwardly toward the front cap.

Upper and lower transfer tubes 208 and 210 are mounted between the front and rear caps centrally thereof in much the same manner as the cylinder sleeves just described. Accordingly, the front cap is formed with an additional pair of recesses 212 and 214 and the rear cap with recesses 216 and 218 in coaxial alignment with 212 and 214 respectively, the aligned recesses receiving the ends of tubes 208 and 210 (see Figure 2). As in the cylinder sleeve construction, O-ring packings 220 are provided at each tube end effectively to seal the tubes in their respective recesses and wave washers 222 are provided between the rear ends of the tubes and the bottoms or recesses 216 and 218.

Thus by assembling the various components in the relation described and illustrated and tightening up on the tie rod nuts 190, a rigid unit structure is achieved with each element securely in place but easily removable for service or replacement. The lower surfaces of the front and rear caps are machined to form smooth, flat mounting pads which mate with similar surfaces on the top of the housing member, the front and rear mating surfaces being indicated at 224 and 226 respectively. As shown in Figure 1, the front cap has a bottom flange 228 through which protrude mounting studs 230 extending from the top of the main housing member. Nuts 232 threadedly engaged on the studs 230 securely position the front cap on the main housing.

Figure 7:
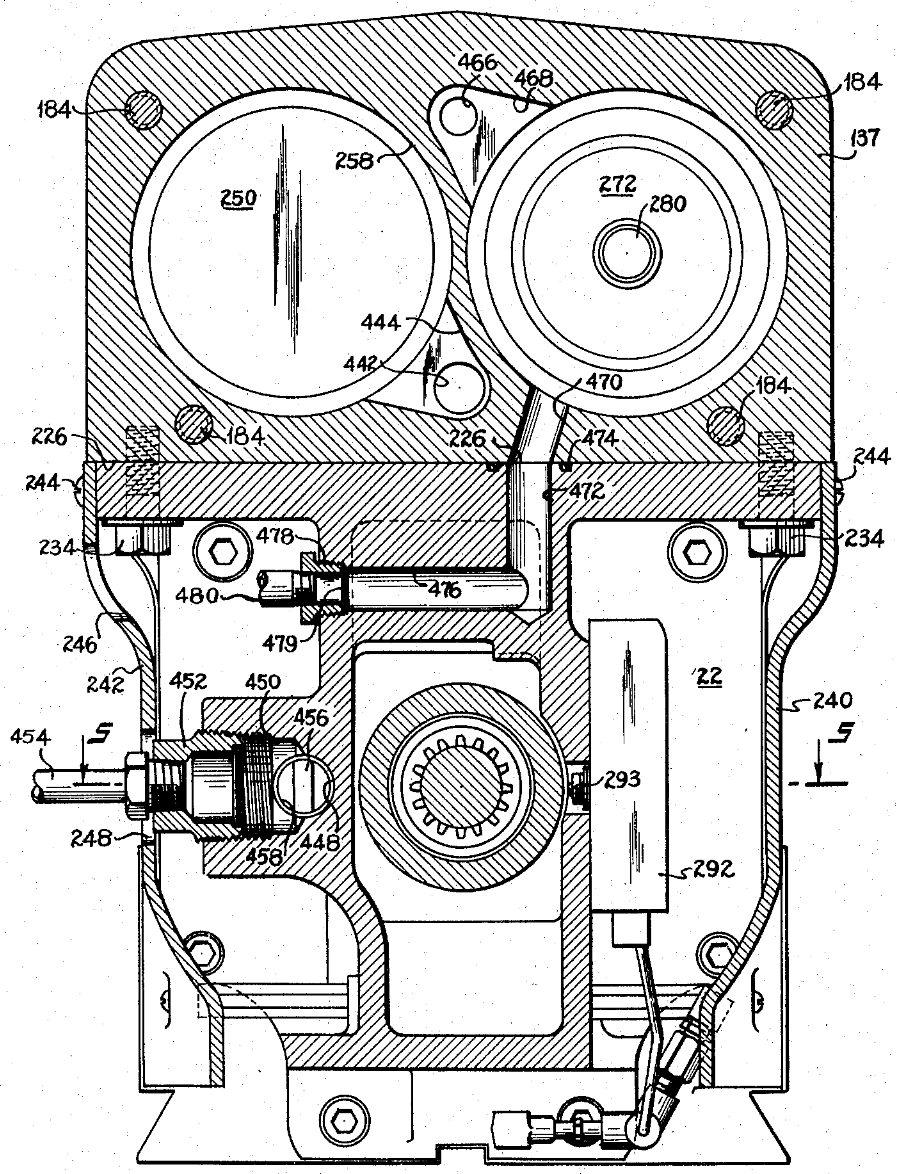
Figure 7 is a sectional view taken on line 7—7 of Figure 2.

The rear cap is secured to the power section 20 by means of bolts 234 threaded upwardly through a flange on the tail piece 22 and into tapped holes in the lower surface of the cap as best seen in Figure 7.

A U-shaped cover 236 of suitable light weight metal is provided to bridge the gap between the front and rear caps and is removably fastened in place as by screws 238, the cover serving to protect the working parts of the control section and also to give the finished unit a neat, attractive appearance. Cover plates 240 and 242 are also provided on the sides of the rear portion of the main casting, being held in place by screws 244. Cover plate 242 is formed with access openings 246 and 248 to allow the passage of necessary supply lines for working fluid as will presently be seen.

Referring now to Figure 3, the rapid approach cylinder 200 contains a free piston 250, having circumferential packing rings 252, which divides the interior of the cylinder into a forward chamber 254 and a rear chamber 256, the head or face 258 of the piston facing the latter. An adjustment rod 260, threaded through the front cap as at 262, extends in to forward chamber 254 and carries a suitably squared tool engaging portion 264 on its outer end. A washer 266 and lock nut 268 maintain any desired adjustment of the rod, the inner end of which abuts against a hardened steel wear button 270 on the under side of piston head 258 to arrest the forward motion of the piston. Thus, by threading the rod 260 into or out of the rapid approach cylinder, the stroke of the piston 250 can be accurately controlled and easily adjusted.

The feed control cylinder 202 also contains a free piston 272 which is in all respects identical to and interchangeable with piston 250 except that it is oppositely arranged in the cylinder, that is, the piston head 274 faces the forward chamber 276 instead of the rear chamber 278. The reason for the oppositely faced arrangement of the pistons is hereinafter explained.

It will be noted that piston 272 has a wear button 280 although there is no adjustment rod to limit piston travel. The button is provided to achieve complete interchangeability of the control pistons and to provide a contact site on piston 272 for a rod (not shown) inserted through aperture 281 in rear cap 180 and normally closed by plug 283 for the purpose of locating the piston in the preadjustment of the system as hereinafter appears.

Referring to Figure 2, the power piston 56, shown in the fully retracted position of the spindle, cooperates with cylinder sleeve 40 and quill seal retainer ring 38 to form the annular chamber 58, sealed at its forward end by packing ring 39 and at its rearward end by rings 57. The chamber 58 is normally filled with a transient body of hydraulic fluid which is part of the working fluid contained in the sealed hydraulic system, hereinafter described, which controls the movements of the spindle 86.

The outer periphery of quill seal retainer ring 38 is formed with an annular groove 282 which has a plurality of ports 284 (two shown, Figure 2) in one side wall, placing the groove in fluid communication with chamber 58. The bottom portion of the land 34 which surrounds the ring 38 is provided with a threaded port 286 in registration with groove 282 and adapted to receive a suitable tube or pipe fitting 288 to which connected tubular conduits 289 and 290 leading to a control switch 292, having a contact button 293 so located as to be engaged by piston extension 62 when the quill is fully retracted. (See Figure 5.) The specific details of construction of the control switch are fully disclosed in copending application Serial Nos. 137,605, filed January 9, 1950, and 243,088 filed August 22, 1951.

Also connected to conduit 289 through suitable coupling members 291 are a check valve assembly 295 and a pressure fitting 297 for filling the hydraulic system as hereinafter explained.

The upper portion of land 34 contains a pair of stepped ports 294 and 296 (Figure 4) adapted to register at the mating surface 224 with a pair of parallel bores 298 and 300 respectively, in cap 178 when the units are assembled as previously described. An upwardly opening check valve assembly indicated generally by reference numeral 302 is located in bore 298 and downwardly opening check valve assembly 304 is located in bore 300. The outer bodies or cages 306 of the check valves are positioned between suitable shoulders provided in the respective bores and stepped ports O-rings 308 seal the assembly clearance between the bodies and the bores and wave spring washers 310 beneath valve body 304 and above valve body 302 resiliently yet securely maintain the valve assemblies in proper position while permitting substantial dimensional deviations between the valve assemblies and the retaining shoulders. Thus, close manufacturing tolerances are eliminated, and production and assembly time minimized.

Above the check valve assemblies, the paralled bores 298 and 300 narrow to reduced diameter portions 312 and 314, respectively, which join larger bores 316 and 318 substantially at right angles. From the structure so far described it will be seen that the check valve 300 functions to permit flow in only a downward direction, i. e. from bore 318, through bore 314 and the check valve to the power cylinder. On the other hand, check valve 302 permits flow only in an upward direction, out of the power cylinder, through the valve and thence to bores 312 and 316.

Figure 10:
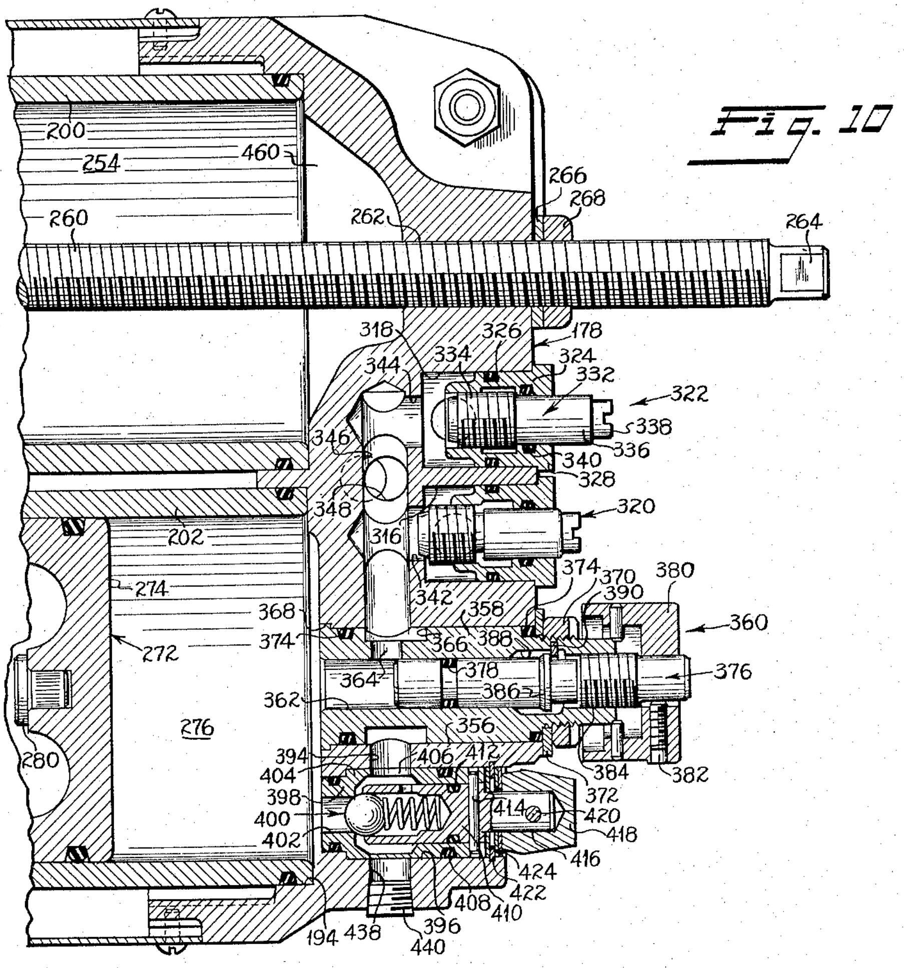
Figure 10 is an enlarged fragmentary sectional view of the forward end of the control section shown in full in Figure 3.
Figure 13:
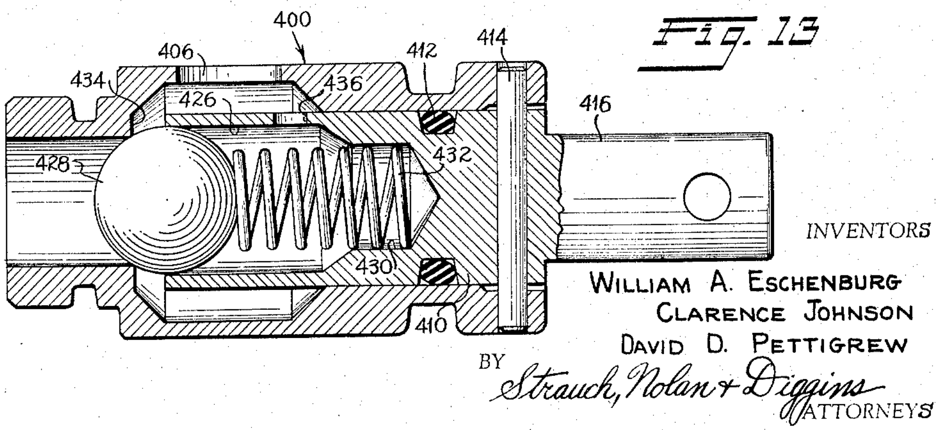
Figure 13 is a longitudinal sectional view of the valve shown diagrammatically in Figure 9.

As most clearly appears in Figure 10, each of the bores 316 and 318 is provided with adjustable needle valves indicated generally at 320 and 322, respectively. Inasmuch as the needle valves are identical, only one (322) will be described in detail. This valve includes a body member 324 having a sliding fit in bore 318 in cap 178 and sealed therein by an O-ring 326. The exterior end of body member 324 terminates in a flange portion 328 which abuts a flat surface machined on the exterior of the front cap when the body is installed in position. Screws 330 (Figure 1) passing through the flange 328 and threaded into the front cap, detachably secure the valve body in place. The needle valve assembly also includes a control element or needle 332 comprising a threaded portion 334 cooperating with suitable threads on the interior of the valve body to move the needle axially relative to the body when the needle is rotated and a reduced diameter stem 336 projecting through the flange portion 328 of the body to the exterior of the front cap and there provided with any convenient tool engaging means such as a kerf 338 whereby the operator may adjust the position of the needle with facility. An O-ring 340 located around the stem, prevents escape of operating fluid between the stem and the body member 324.

Referring to Figures 3 and 10, bores 316 and 318 have reduced diameter portions 342 and 344, respectively, which join a common transverse duct 346 communicating with the upper end of an oblique 348 which in turn leads to and communicates with the interior of transfer tube 210 through an intermediate bore 350, as best shown in Figure 2. It will be noted that duct 348 has a portion 352 which extends beyond its junction with bore 350. The portion 352 has no functional utility but is necessary as a manufacturing expedient to permit the drilling of bore 348. Consequently the end of extensions 352 is sealed off at the mating surfaces 224 by means of an O-ring 354 provided in a suitable recess in the top mating surface of the housing member 26. The upper end of bore 348 joins a reduced diameter bore 349 leading to the exterior surface of the front cap 178 where it is closed by a plug 351, removable to bleed air from the hydraulic system while it is being filled.

With further reference to transverse duct 346, Figures 3 and 10, one end penetrates through the side wall of a bore 356 containing the cylindrical body 358 of a valve assembly indicated generally by reference character 360. Valve body 358 has an axial bore 362 which is open at its inner end to chamber 276 of feed control cylinder 202 and is in communication with bore 346 through a stepped triangular port 364 in a circumferential groove 366 in valve body 358. The valve body is removably retained in the bore 356 by means of an annular flange 368 on the inner end thereof abutting against and recessed in the rear face of the front cap and a lock nut 370 threadedly engaging the outer end of the body and bearing against the forward face of the front cap through a suitable washer 372. O-rings 374 are provided at either end of the valve body to form a fluid tight seal within the surrounding bore.

Flow through triangular port 364 is controlled by an adjustable plunger or control element 376 disposed in bore 362 and sealed by means of an O-ring 378. The outer end of the plunger projects through the forward face of the front cap and carries an adjustment knob 380 secured thereto by means of a set screw 382 engaging on a suitable flat. A threadedly engaged portion 384 is provided between the plunger 376 and bore 362 whereby rotation of the plunger by means of knob 380 results in axial displacement of the plunger in the bore, thus varying the degree of flow restriction through port 364. The control element or plunger 376 is also formed with a collar 386 accommodated by a relieved portion 388 in bore 362 and a radial key 390, projecting through a slot in the wall of the bore into the relieved portion is so located as to be contacted by the collar to prevent the plunger from being accidentally unscrewed beyond the limit of the engaging threads 384. The key 390 is held in position by nut 370 and, should it become necessary to remove the plunger, for example to replace the O-ring 374, the removal may be quickly accomplished by taking off the knob 380, threading off the nut 370 to expose the key, withdrawing the key, and unscrewing the plunger from the bore.

The knob 380 is preferably knurled around its outer periphery, as may be seen in Figure 1, to permit easy manual adjustment by an operator. In addition, the outer circumference of the knob is also provided with suitable calibration indicia cooperating with a scribe mark on the front cap to assist the operator in determining the amount of adjustment to be made, the spacing of such calibrations being selected in accordance with the pitch of threads 384 so that the amount of axial displacement of the control plunger bears a definite and predetermined relation to the indicia on the adjustment screw.

In spaced coaxial alignment with duct 346 is a duct 394, which is a combination of duct 346 the ducts being in flow communication through the circumferential groove 366. The duct 394 terminates in the side wall of a bore 396 containing the substantially cylindrical body member 398 of a valved ball check assembly indicated generally by reference character 400. The body 398 contains an axial bore 402 having its inner end in open communication with chamber 276 of feed control cylinder 202 and having an enlarged portion 404 containing a radial port 406.

As shown in Figures 3 and 10, port 406 is adapted to register with duct 394; the valve body 398, however, is rotatably mounted in the bore 396, and sealed therein by O-rings 408, so that by rotating the body by approximately 90°, port 406 may be turned out of registration with the duct 394 for reasons which will hereinafter appear.

A ball check guide and retainer element 410 is disposed in bore 402 in the valve body and sealed therein by O-ring 412. A dowel pin 414 passing through the body and retainer connects the two for conjoint movement, the retainer having a reduced diameter shank 416 projecting through the forward face of the front cap whereas it is provided with an actuating lever 418, pinned to the shank as by a dowel 420. The assembly 400 is maintained in position by means of snap ring 422 in the outer end of bore 396, disposed between washers 424 encircling tenon 416.

The retainer 410 is formed with an internal blind bore 426 opening toward the chamber 276 and freely receiving a ball check 428, and being reduced as at 430 to receive and position compression spring 432 which resiliently urges the ball check out of bore 426 and into sealing contact with a valve seat 434. A small radial port 436 in the wall of retainer 410 serves to admit fluid pressure from duct 394 to the space bore 426 behind the ball 428 to assist spring 432.

The bore indicated by reference numeral 438 and sealed off by means of thread plug 440 has no function utility but is necessary as a manufacturing expedient. Thus, bores 346 and 394 may be formed in a single drilling operation.

From the structure thus far described it will be understood that, with the valve body 398 in the position shown in Figure 10, the ball check permits unidirectional flow from chamber 276 to the duct 394 and that by manipulation of the lever knob 418, the entire assembly 400 is rotated to move port 406 out of registration with duct 394, thereby precluding flow through ducts 394 and 402 in either direction. This position of valve 400 is diagrammatically shown in Figure 9.

The transfer tube 210 runs the length of the control section and connects bore 350 in the front cap with a coaxial bore 442 in the rear cap. As can be seen from Figures 2 and 7, bore 442 terminates in a clearance space 444 which merges with rear chamber 256 behind the rapid approach piston 250.

The valves and ducts so far described form a closed control system adapted to contain and operate on a suitable, substantially incompressible hydraulic fluid as will be fully explained in conjunction with the operation of the invention. The primary motive power for advancing and retracting the spindle is derived from an expendible pressurized gas such as compressed air in a separate but cooperating system now to be described.

The back face of the power piston 56 is relieved or cut back to define a centrally located, annular abutment portion 446 which contacts the inner face 447 of tail piece 22 when the quill is in the fully retracted position, shown in Figure 2, thus limiting the minimum volume of rear chamber 60. As shown in Figure 5, a duct 448 in the tailpiece connects chamber 60 with a bore 450 which threadedly receives an adapter plug 452 for the connection of an air line 454 leading to a source of air pressure through a valve indicated at C in the schematic view of Figure 8.

With further reference to Figure 5, a locating rod 456 is secured to the rear face of piston 56 and extends into bore 448, the purpose of the rod being to prevent rotation of the piston-quill assembly due the slight but inevitable friction of the bearings 90 and 92. A replaceable bushing 458 is preferably provided in bore 448 to absorb wear and protect the bore.

The rear face of the front cap 178 is recessed as at 460 adjacent the forward end of chamber 254 and an oblique bore 462 (Figure 6) extends from the recess to a bore 464 leading to the forward end of transfer tube 208, the opposite or rear end of which is in communication with a coaxial bore 466 in the rear cap 180. Bore 466 terminates in a clearance space 468 which merges with rear chamber 278 behind the feed rate control piston 272.

Referring now to Figure 7, the clearance space 468 is joined by an oblique duct 470 which extends to the mating surfaces 226 of the rear cap 180 and tail piece 22, where it connects with a duct 472 in the tail piece, a suitable O-ring 474 being provided between the mating surfaces to seal the junction of the ducts.

Duct 472 intersects a traverse bore 476, the outer end of which is provided with a threaded adapted fitting 478 containing a filter element 479 for the connection of an air line 480 leading to valve C, Figure 8.

As shown in the schematic view, conduits A and B, representing air lines 480 and 454, respectively, are connected to the two position valve C comprising an inlet port D adapted to be connected to a source (not shown) of air under suitable pressure, and a pair of exhaust ports E and F, open to the atmosphere. The ports of the valve C are controlled by means of a reciprocable element G which may be actuated i. e., moved between the full line and dotted line positions, by any convenient means, for example, by a solenoid represented by coil Q energized by means of electrical wires R connected to a source electrical current (not shown) through switch 292.

Referring to Figures 2 and 3, control pistons 250 and 272 and power piston 56 are shown in the positions occupied thereby when the quill is fully retracted, i. e., at the start of a cycle of operation. It will be noted that the feed rate control piston 272 does not diminish hydraulic chamber 276 to substantially zero volume at any point in the cycle or, otherwise stated, does not move to the extreme forward position even when the quill is fully retracted. Thus, there is always a minimum residual volume to chamber 276 which serves as a reservoir for hydraulic fluid to compensate for losses of fluid due to leakage in the system. Consequently, the hydraulic system is maintained completely full at all times, thereby eliminating the possibility of variations in the cycle due to insufficient fluid.

As fluid is lost from the system, the volume of the reservoir decreases progressively. To determine the necessity of adding fluid, the quill is stopped in fully retracted position, plug 283 removed and a suitable calibrated feeler rod inserted through aperture 281 until button 280 is contacted, indicating the position of piston 272 and consequently, the relative amount of fluid remaining in the reservoir.

To fill the hydraulic system, accordingly, plugs 351 (Figure 2) and 283 (Figure 3) are removed and valve "C" Figure 8 is moved to its full line position. Hydraulic fluid under pressure is then supplied to Alemite fitting 297 the lowest point in the system and, as the fluid fills the system, air is expelled through passage 349 at the highest point. Power piston 56 is driven back to its fully retracted position the air behind the piston passing out through open valve C. Likewise, air in chamber 278 behind piston 272 is forced out of aperture 281 as the fluid entering chamber 276 forces the piston rearwardly and air in chamber 256 is forced out through open valve "C" as fluid enters chamber 256 and drives piston 250 forwardly. Admission of fluid to the system is continued until it starts to discharge from duct 349 indicating that the system is completely full whereupon adjustment rod 260 is threaded all the way into the rapid approach cylinder until piston 250 is forced into engagement of the rear cap and piston 272 is pushed forwardly by means of a calibrated rod inserted in aperture 281 to a position accommodating the desired volume of reserve fluid in chamber 276. The hydraulic fluid thus expelled from chambers 256 and 276 pass through the various conduits of the system and finally out through duct 349, insuring that the system is entirely free of air pockets, bubbles and the like. The ball check valve 295 (Figure 2) prevents back flow of fluid out of the filing fitting and after the plugs are replaced, the unit is ready for operation.

The operation of the invention will for the sake of simplicity and clarity of disclosure, be described in conjunction with the schematic layout in Figure 8 in which the power piston and control pistons are shown in the positions assumed at the start of the rapid advance portion of the operating cycle. In this schematic view, all diagrammatic representations of major components are identified by the same reference character as the corresponding structural elements already described in detail but to avoid confusion between the actual and the schematic views, flow conduits have been identified by letters rather than numerals.

Referring then to Figure 8, with the valve element G in the solid line position air conduit B is placed in communication with the atmosphere through exhaust port E while air conduit A is connected with air inlet D. Accordingly, compressed air flows through conduit A, enters chamber 60 and forces power piston 56 and the associated quill 66 and spindle 86 to the right. The hydraulic fluid present in forward chamber 58 of the power cylinder is expelled through conduit H, passes through check valve 302, conduit J, metering valve 320, and conduits K, L, M, to the rear (left hand) chamber 256 of rapid approach cylinder 200. The forward (right hand) chamber 254 of cylinder is vented to the atmosphere through ducts N and B and port E; therefore, rapid approach piston 250 is free to move to the right as rapidly as hydraulic fluid is controlled by needle valve 320. If valve 320 is fully opened, the speed of piston 250 is limited only by the size of the flow conduits and since the speed of piston 250 controls the speed of power piston 56, the latter moves rapidly to the right thus permitting the tool carried by the spindle 86 to be quickly advanced to the point where it engages the work. This is the "rapid approach" portion of the cycle, the length of which may be adjusted by screwing rod 260 into cylinder 200 to shorten the approach distance or out of the cylinder to lengthen it.

The rapid approach movement will continue until piston 250 strikes the end of adjustment rod 260 at which time no further hydraulic fluid flow through passage M is possible and the flow from chamber 58 of the power cylinder will now take a new path H, check valve 302, J, needle valve 320, K, P, and needle valve 360 into the chamber 276 of feed rate control cylinder 202. The unit now is in the feed portion of its cycle and the rate of forward or advance feed of the spindle is dependent upon the setting feed rate control valve 360. Since the chamber 278 of cylinder 202 is vented to the atmosphere through lines O, B and port E of valve C, the piston 272 will move to the left under the influence of the hydraulic fluid being exhausted from chamber 58 and the spindle will feed at the rate determined by the setting of the valve 360, provided of course, that the needle valve 320 is opened a greater amount than needle valve 360.

In this respect, it is pointed out that with the valved ball check assembly 400 in the open position shown in Figure 8, valve 320 controls the maximum rate of forward traverse of piston 56 while feed rate valve 360 controls the minimum. In other words, if valve 320 is opened to a greater extent than valve 360, the unit will traverse at a rate determined by valve 320 until piston 250 abuts against stop 260. For the remainder of the advance stroke the rate of traverse will be determined by the setting of valve 360; on the other hand, if the degree of opening of 320 is less than that of valve 360, the entire forward stroke will take place at a rate of traverse set by valve 320. The piston 56 and associated quill and spindle cannot traverse forwardly (to the right) at a rate greater than that allowed by the setting of valve 320.

Thus, with valve 400 in the open position shown in Figure 8, the forward motion of the unit can be divided into two different and independent components, the rate of feed for each component being infinitely adjustable by means of valves 320 and 360 and the length of each component being infinitely adjustable by means of stop 260.

The ability of the unit to function in this manner, that is, with two different adjustable rates of advance, is extremely advantageous, for example, when it is desired to machine in one stroke two materials of different hardness. In such an event, the valve 320 is set so that the tool carried by the piston-quill spindle assembly 56, 66, and 86 will approach and machine the first material at the recommended machining rate. The stop rod 260 would be adjusted so that when the machining of the first material was accomplished, the piston 250 would about the stop and piston 56 would continue on at a slower rate as determined by the setting of valve 360, to machine the second material at its recommended machining rate.

When the piston 56 reaches the limit of its forward travel as established by the pre-adjusted position of stop nut 130, the unit is ready for the retraction cycle, which is effected by shuttling the valve element G to its dotted line position (Figure 8). This may be accomplished automatically by means of a pressure sensitive limit switch shown diagrammatically at 292 and fully disclosed in copending applications Serial Nos. 137,605 and 243,088 as aforementioned.

Briefly the pressure in chamber 58 is conveyed to the switch 292 through conduit S (289 and 290 in the actual structure, Figure 2) the switch being adjusted to operate at a predetermined unit pressure. When, for any reason, the advancement of piston 56 is halted, for example, when the quill shoulder 174 abuts stop nut 130 or the drill bit (not shown) encounters an impenetrable obstruction, the pressure in chamber 58 falls off almost instantaneously and switch 292 is actuated to deenergize the solenoid armature coil Q through wires R, thus allowing spring U to move the valve element G to the position shown in dotted lines, Figure 8.

Figures 8, 9:
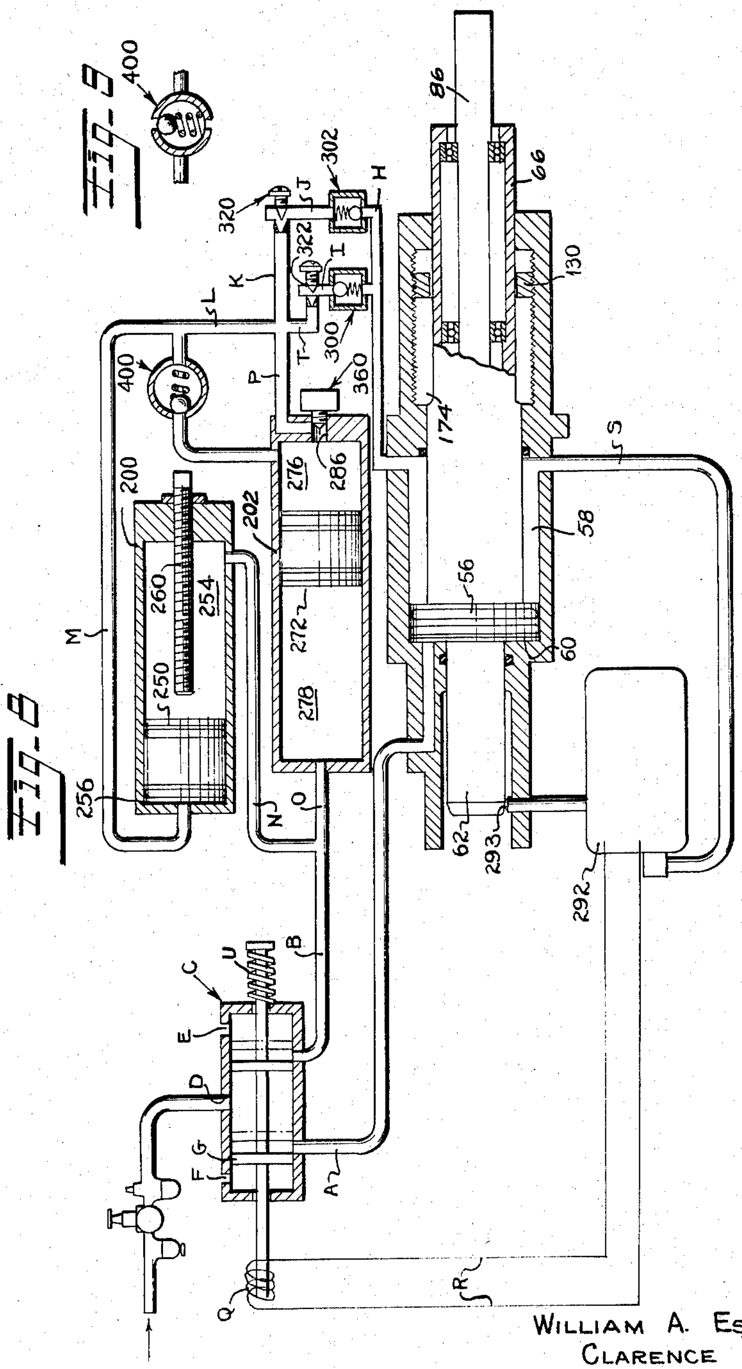
Figure 9 is a diagrammatic view showing the alternate, closed position of a valve employed in the control system.

By whatever means it is accomplished, the shuttle valve is moved to its dotted line position, in which position compressed air is supplied through port D, through the valve C, into conduit B and from there through passages N and O to forward chamber 254 of cylinder 200 and to rear chamber 278 of cylinder 202, respectively. At the same time, chamber 60 will be vented to the atmosphere through duct A and port F. As previously mentioned valve 400 may be rotated selectively to an open position, as shown in Figure 8 or closed position as shown in Figure 9, for a purpose which will hereinafter be explained. For the present, the retraction cycle will be described as it occurs with valve 400 in its open position.

When compressed air is supplied to chambers 254 and 278 the hydraulic fluid in chamber 256 will be exhausted through passages M, L, T, needle valve 322, duct I, ball check 300, and passage H into chamber 58 of the power cylinder, moving the power piston 56 to the left so as to retract the quill and force the air in rear chamber 60 out through line A and valve port F to the atmosphere.

It will be noted no flow can occur through passage K, valve 320 and conduit J because check valve 302 is closed to flow in this direction, and therefore the hydraulic fluid must pass through needle valve 322 and check valve 300. The rate of traverse during the retract stroke therefore can be controlled by adjustment of valve 322. In this connection, it should be noted that the same air pressure acting in chamber 254 of cylinder 200 acts in chamber 278 of cylinder 202 and tends to expel hydraulic fluid through ball check valve 400 and needle valve 360. However no flow will occur through the check valve at this point in the cycle because fluid pressure in line L acts on the back of the ball and assists the closing spring to keep the ball seated against the pressure in chamber 276. Since the pressures in chambers 254 and 278 are equal (having a common source) the pressures in chamber 276 and line L are substantially equal and, acting on opposite sides of the ball, neutralize each other accordingly the spring keeps the check ball in closed position.

It will be understood that, during this first stage of retraction, while piston 250 is moving to the left, the flow occurring through valve 360, regardless of setting, is inconsequential. When piston 250 reaches the extreme left of cylinder 200, the pressure in lines M and L falls off and the ball check in valve 400 opens under the pressure in chamber 276 and piston 272 moves to the right expelling the hydraulic fluid from chamber 276, through lines L, P, T, needle valve 322, duct I, ball check 300 and line H to chamber 58 of the power cylinder. Thus flow is still controlled by valve 322 and the opening of the ball check in valve 400 has no effect on the retraction rate.

When the quill is fully retracted, extension 62 engages and actuates contact button 293 on control switch 292 which reestablishes the circuit to energize solenoid armature Q and return valve element G to the solid line position, thus automatically repeating the cycle of operation.

From the foregoing description it will be seen that the unit is capable of retracting at a single rate, which rate is infinitely variable by means of needle valve 322. This ability is very important in machining operations where a controlled retraction rate is required. For example, in tapping, it is necessary to rapidly advance the tap to the work, tap at a somewhat reduced rate of feed, and then retract at the same reduced rate as the advance feed rate.

In certain machining operations it is advantageous to have different traverse rates during the retraction stroke and valve 400 renders the present novel control unit capable of accomplishing such a function.

For example, in back spot facing operations it is sometimes desirable that the unit traverse rapidly during the first portion of the retraction stroke and then feed back for the remainder, during which time the back spot facing operation is accomplished. When such operation is desired, the valve 400 is turned to its closed position as shown in Figure 9. When compressed air is applied to pistons 250 and 272 the fluid will first be rapidly exhausted from chamber 256 of cylinder 200 to chamber 58 of the power cylinder at a rate determined by the setting of valve 322 to accomplish the rapid traverse portion of the retraction stroke. After all the hydraulic fluid has been exhausted from chamber 256, since valve 400 is closed, the hydraulic fluid in chamber 276, will flow through feed valve 360 (which would be set to permit less flow than valve 322) into chamber 58 thus accomplishing the back feed portion of the retraction stroke.

This novel system, therefore, will permit a cycle with two different rates of infinitely adjustable forward feeds with retraction at a single adjustable rate, or a cycle with two different rates of retraction.

As can be seen in Figures 1 and 3, all operating controls are centralized and conveniently located on the forward portion of the unit where they may be quickly and easily adjusted. Valve 400 may be opened or closed by lever 418. Metering needle valves 320 and 322 for controlling the rapid approach rate and the rapid retract rate are conveniently adjustable by means of a screw driver or similar tool engaged in kerfs 338; the feed valve 360 is adjustable by rotation of calibrated knob 380; the length of the rapid approach stroke is adjusted by threading rod 260 in or out the desired amount; and the total length of stroke is adjusted by rotation of knob 168 on the graduated dial 164.

The advantages of the present invention over prior devices, which will be apparent from the foregoing description, are both structural and operational.

In regard to structure, the present unit is characterized by ease and economy of manufacture and maintenance in that practically all close tolerances are eliminated and parts are easily replaceable.

As for operation, and particularly flexibility of operation, the present unit provides automatic advance and retract cycles either impossible or difficult to achieve with prior known units. For example, a uniform advance feed rate and retract feed rate for tapping operations could not be obtained with prior device of this type without restriction of the length of stroke and loss of the rapid approach thereby increasing the time required for the operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letter Patent is:

1. In a machine tool wherein a tool carrying assembly is advanced and retracted relative to a stationary housing to perform machining operations by the selective application and removal of a force to one side of a piston disposed in a power cylinder and connected to said assembly and the rate of movement of said piston is governed by the flow of a body of substantially incompressible fluid transiently occupying said power cylinder on the opposite side of said piston: a closed system for controlling the rate of expulsion from and return to said other end of the power cylinder of said incompressible fluid comprising a freely expansible chamber, conduit means adapted to conduct said fluid to said chamber, said conduit means including a circuit having two branches connected in parallel in said conduit, means limiting the flow in the branches of said circuit to single, opposite directions and for individually adjusting the rate of flow in each branch, a second free expansible chamber, second and third conduit means placing said first and second expansible chambers in flow communication, means for selectively adjusting the rate through said second conduit means, means normally closing said third conduit means and adapted to open when the fluid pressure in said second expansible chamber exceeds that in said first mentioned conduit means, and means for simultaneously contracting said expansible chambers and removing the force applied to said piston.

2. In a machine tool according to claim 1, means selectively operable to prevent fluid flow through said third conduit means.

3. In a machine tool according to claim 2, means to vary the maximum volume of said first expansible chamber and means to vary the stroke of said piston.

4. In a hydro-pneumatic power system, a power cylinder, a first control cylinder, a second control cylinder, a double-acting piston in each of said cylinders, means connecting one end of said power cylinder to a source of pressure and one end of each said control cylinders to the atmosphere and for selectively reversing said connections, and a hydraulic system for controlling the movement of said power piston under the influence of said pressure, comprising a first fluid conduit connecting the opposite end of said power cylinder and first control cylinder, means in said first fluid conduit for variably controlling the rate of fluid flow and for limiting the flow in one direction, a second fluid conduit communicating with said first fluid conduit at spaced points at either side of and bypassing said flow control and direction limiting means, said second fluid conduit having means for variably controlling the rate of flow and limiting the flow to a direction opposite that in said first fluid conduit, third and fourth fluid conduits placing the opposite end of said second control cylinder in flow communication with said first and second fluid conduits at a point between said opposite end of said first control cylinder and the flow control and direction limiting means in said first and second conduits, each third conduit containing means for adjustably controlling the rate of flow therethrough and said fourth conduit containing normally closed valve means adapted to open and permit unidirectional flow out of said second control cylinder when the pressure therein exceeds that in said first and second fluid conduits.

5. In a hydro-pneumatic power system according to claim 4, means for varying the effective volume of said first control cylinder.

6. In a hydro-pneumatic power system according to claim 4, said fourth conduit containing additional valve means selectively operable to close the conduit to fluid flow in both directions regardless of the pressure differential across said normally closed valve means.

7. In a hydro-pneumatic power system according to claim 4, means for varying the effective stroke of the piston in said power cylinder.

8. A hydro-pneumatic power system for machine tools comprising a power cylinder, a rapid approach control cylinder and a feed control cylinder, a double-acting piston axially slidably disposed in and dividing each of said cylinders into a pneumatic chamber and a hydraulic chamber, reversible control valve means adapted, in one position to connect the pneumatic chamber of said power cylinder to a source of pneumatic pressure while venting the pneumatic chambers of said control cylinders to the atmosphere and, in an alternate position to vent said power cylinder pneumatic chamber to the atmosphere while connecting said control cylinder pneumatic chambers with said source of pneumatic pressure, a closed hydraulic control circuit comprising a first fluid conduit connecting the hydraulic chambers of said power cylinder and rapid approach control cylinder, unidirectional flow means in said conduit limiting flow therein to a direction toward said power cylinder, adjustable flow means for varying the rate of flow in said first conduit, means forming a second conduit having its ends in communication with said first conduit and forming a bypass circuit around said unidirectional and adjustable flow means, means in said second conduit for controlling the rate of flow therein and means for limiting flow to a direction opposite that in said first conduit, third and fourth conduits connecting the hydraulic chamber of said feed control cylinder with said first conduit at a point between said rapid approach cylinder and said bypass circuit, means in said third conduit operable to vary the rate of flow therethrough and means normally closing said fourth circuit and adapted to open and permit unidirectional flow therethrough when the pressure in the hydraulic chamber of said feed control cylinder exceeds the pressure in said first and second conduits.

9. A hydropneumatic power system for machine tools comprising a power cylinder, a rapid approach control cylinder and a feed control cylinder, a double-acting piston axially slidably disposed in and dividing each of said cylinders into a pneumatic chamber and a hydraulic chamber, reversible control valve means adapted, in one position to connect the pneumatic chamber of said power cylinder to a source of pneumatic pressure while venting the pneumatic chambers of said control cylinders to exhaust and, in an alternate position, to vent said power cylinder pneumatic chamber to exhaust while connecting said control cylinder pneumatic chambers with said source of pneumatic pressure, a closed hydraulic system comprising a fluid conduit connecting the respective hydraulic chambers of said power cylinder and said rapid approach cylinder, said conduit including a circuit having two branches connected in parallel with said conduit, means limiting the flow in said branches to single and opposite directions, means for individually varying the rate of flow in each of said branches, second and third fluid conduits connecting the hydraulic chamber of said feed control cylinder to said first conduit at a point between said circuit and the hydraulic chamber of said rapid approach cylinder, means in said second conduit for selectively varying the rate of flow therethrough, and means in said third conduit adapted in one position, to preclude flow therethrough and, in a second position to permit flow therethrough only in a direction out of said feed control cylinder when the pressure therein exceeds the pressure in said first conduit.

10. A hydro-pneumatic system as defined in claim 9 including adjustable stop means extending into the pneumatic chamber of said rapid approach cylinder for limiting the movement of the piston therein.

11. A hydro-pneumatic power system as defined in claim 9, including adjustable means for establishing a limit position for the travel of said power cylinder piston toward the hydraulic chamber in said power cylinder and means for automatically changing the position of said reversible valve means when said power piston reaches said limit position.

12. A hydro-pneumatic power tool comprising a power section and a control section, said power section including a main housing and a tail piece, a sleeve clampingly secured between said main housing and tail piece to form a power cylinder, said control section including a front cap and a rear cap detachably secured to said main housing and tail piece, respectively, a first and a second cylindrical sleeve clampingly secured between said front and rear cap to form a first control cylinder and a second control cylinder, elongated tubular members clampingly secured between said front and rear cap to form fluid transfer means, a double acting piston disposed in and dividing each of said cylinders into a hydraulic chamber and a pneumatic chamber, the pneumatic chamber in said first control cylinder being adjacent said front cap and in said second control cylinder adjacent the rear cap, pneumatic passage means in said front and rear cap and including one of said tubular members for connecting the pneumatic chambers of said first and second control cylinders, pneumatic conduit means in said tail piece leading to the pneumatic chamber of said power cylinder, means including a multi-conduit, multi-way valve for connecting said passage means with a source of pneumatic pressure while connecting said conduit means to exhaust and selectively operable to reverse said connections, and a closed hydraulic system for controlling the rate of movement of said pistons due to the alternate application and exhaust of pneumatic pressure in said conduit means and passage means.

13. The hydro-pneumatic power tool defined in claim 12 wherein said closed hydraulic system comprises a first hydraulic fluid conduit connecting the hydraulic chambers of said first control cylinder and said power cylinder, said hydraulic conduit including a circuit having two branches connected in parallel in said conduit, means limiting the flow in said branches to single and opposite directions, means for individually varying the rate of flow in each of said branches, a second and a third hydraulic fluid conduit connecting the hydraulic chambers of said second control cylinder and said first hydraulic conduit at a point between said circuit and said first control cylinder hydraulic chamber, means in said second hydraulic conduit for selectively varying the rate of flow therethrough, and means normally closing said third hydraulic conduit and adapted to open when the pressure in said second control cylinder hydraulic chamber exceeds that in said first hydraulic conduit.

14. The hydro-pneumatic power tool defined in claim 12, wherein said closed hydraulic system comprises a hydraulic clearance space formed in said rear cap adjacent and in direct communication with the hydraulic chamber of said first control cylinder, a first hydraulic conduit including passages in said front and rear cap and the other of said tubular members connecting the hydraulic chambers of said first control cylinder and said power cylinder, said hydraulic conduit including a circuit formed of a plurality of ducts in said front cap and consisting of two branches connected in parallel in said hydraulic conduit, means in said ducts for limiting the flow in said branches to single and opposite directions, an adjustable metering valve in each of said branches for individually selectively varying the rate of flow in each of said branches, second and third hydraulic fluid conduits formed in said front cap and connecting the hydraulic chamber of said second control cylinder to said first hydraulic conduit at a point between said circuit and said first control cylinder hydraulic chamber, an adjustable metering valve in said second hydraulic conduit for selectively varying the rate of flow therethrough, normally closed valve means in said third hydraulic conduit adapted to open when the pressure in said second control cylinder exceeds that in said first hydraulic conduit and additional valve means operable to close said third hydraulic conduit and render the operation of said normally closed valve means ineffective.

15. The hydro-pneumatic power tool defined in claim 14, wherein said valve means and metering valves include adjustment portions extending through and accessible from the exterior of said front cap.

16. The hydro-pneumatic power tool defined in claim 14, wherein said normally closed valve means comprises a check valve element having, in closed position, substantially equal and opposite surfaces exposed to the fluid pressure in said second control cylinder and said first hydraulic fluid conduit and resilient means augmenting the effect of the pressure in said first hydraulic fluid conduit and urging said check valve element toward closed position.

17. In combination with a hydro-pneumatically operated power tool including a hydraulic control circuit, a valve assembly for controlling flow through said circuit comprising a substantially cylindrical body having a plurality of ports normaly in flow communication with said circuit to form a free flow path through said body, a valve seat around one of said ports, a ball check element in said body, means resiliently urging said ball check into sealing contact with said valve seat, guide means constraining said ball check to linear movement toward and away from said valve seat, and means for turning said valve body to occlude said free flow path.

18. In a hydro-pneumatic power feed mechanism for a power tool and the like, a power cylinder, a power piston in the power cylinder, means to apply fluid pressure to one side of the piston to move the piston through an advance stroke and to release the fluid pressure to permit the piston to move through a retract stroke, and means to admit liquid under pressure to the opposite side of the piston to retract the piston and to release the liquid to permit the piston to advance, said last-named means including a fluid control circuit connected to the power cylinder at said opposite side of the piston, said circuit including a pair of parallel paths, each containing a restricted orifice and a one-way valve, the two one-way valves only allowing flow in opposite directions, whereby the rates of advance and retraction of the power piston are controlled independently.

19. A hydro-pneumatic power feed mechanism according to claim 18 wherein said restricted orifice in each of the parallel paths comprises an adjustable valve whereby the flow rates through said parallel paths are independently adjustable to vary the rates of advance and retraction.

20. A hydro-pneumatic power feed mechanism according to claim 19 wherein the fluid control circuit also includes a restricted orifice in series with said parallel paths, and means for rendering said last-named restricted orifice ineffective during at least a portion of the movement of the power piston.

21. A hydro-pneumatic power feed mechanism according to claim 19 wherein the fluid control circuit also includes an auxiliary pair of parallel paths in series with the first pair of parallel paths, an adjustable valve in one of the auxiliary pair of parallel paths, and means to render the other of the auxiliary pair of parallel paths ineffective during at least a portion of the movement of the power piston.

22. A hydro-pneumatic power feed mechanism according to claim 21 wherein there is a connection between said auxiliary pair of paths containing a one-way valve which is adjustable to close the connection or to allow substantially free flow of liquid from said one of the auxiliary paths to the said other of the auxiliary paths.

23. A hydro-pneumatic power feed mechanism according to claim 21 wherein said other of the auxiliary pair of parallel paths includes an expansible chamber and adjustable means to limit the expansion of the expansible chamber.

References Cited in the file of this patent

UNITED STATES PATENTS

| | | |
|---|---|---|
| 706,688 | Reynders et al. | Aug. 12, 1902 |
| 1,986,848 | Perry | Jan. 8, 1935 |
| 2,605,748 | Rasoletti | Aug. 5, 1952 |
| 2,655,058 | Eschenburg et al. | Oct. 13, 1953 |
| 2,684,017 | Schafer | July 20, 1954 |
| 2,733,691 | Johnson | Feb. 7, 1956 |